US009524100B2

(12) United States Patent
Gschwind et al.

(10) Patent No.: US 9,524,100 B2
(45) Date of Patent: *Dec. 20, 2016

(54) PAGE TABLE INCLUDING DATA FETCH WIDTH INDICATOR

(71) Applicant: International Business Machines Corporation, Armonk, NY (US)

(72) Inventors: Michael K. Gschwind, Chappaqua, NY (US); Jose E. Moreira, Irvington, NY (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/483,550

(22) Filed: Sep. 11, 2014

(65) Prior Publication Data

US 2015/0293855 A1    Oct. 15, 2015

Related U.S. Application Data

(63) Continuation of application No. 14/253,059, filed on Apr. 15, 2014.

(51) Int. Cl.
*G06F 12/08* (2016.01)
*G06F 3/06* (2006.01)

(52) U.S. Cl.
CPC .......... *G06F 3/0604* (2013.01); *G06F 3/0629* (2013.01); *G06F 3/0673* (2013.01); *G06F 12/0862* (2013.01); *G06F 12/0882* (2013.01)

(58) Field of Classification Search
CPC .. G06F 12/0886; G06F 9/3802; G06F 9/3816; G06F 2212/60; G06F 2212/602; G06F 12/0862; G06F 12/0846; G06F 12/0853; G06F 12/0873; G06F 3/0604; G06F 12/0882; G06F 3/0673; G06F 3/0629
(Continued)

(56) References Cited

U.S. PATENT DOCUMENTS 5,987,587 A * 11/1999 Meltzer ................. G06F 9/3885
712/10
6,510,475 B1 * 1/2003 Bennett ............... G06F 13/4059
710/52

(Continued)

OTHER PUBLICATIONS

List of IBM Patents or Patent Applications Treated as Related; Sep. 11, 2014; pp. 1-2.
(Continued)

*Primary Examiner* — Brian Peugh
*Assistant Examiner* — Alex Olson
(74) *Attorney, Agent, or Firm* — Cantor Colburn LLP; Steven Bennett

(57) ABSTRACT

Embodiments relate to a page table including a data fetch width indicator. An aspect includes allocating a memory page in a main memory to an application. Another aspect includes creating a page table entry corresponding to the memory page in the page table. Another aspect includes determining, by a data fetch width indicator determination logic, the data fetch width indicator for the memory page. Another aspect includes sending a notification of the data fetch width indicator from the data fetch width indicator determination logic to supervisory software. Another aspect includes setting the data fetch width indicator in the page table entry by the supervisory software based on the notification. Another aspect includes, based on a cache miss in the cache memory corresponding to an address that is located in the memory page, fetching an amount of data from the memory page based on the data fetch width indicator.

10 Claims, 9 Drawing Sheets

(58) Field of Classification Search
USPC .......................................................... 711/113
See application file for complete search history.

(56) References Cited

U.S. PATENT DOCUMENTS

| | | | | |
|---|---|---|---|---|
| 6,654,869 | B1* | 11/2003 | Kahle | G06F 9/382 712/209 |
| 7,822,926 | B2* | 10/2010 | Croxford | G06F 12/0886 711/129 |
| 7,904,661 | B2* | 3/2011 | Fluhr | G06F 12/0862 711/100 |
| 8,250,303 | B2* | 8/2012 | Bernstein | G06F 12/0886 711/118 |
| 2007/0277021 | A1* | 11/2007 | O'Connor | G06F 9/30021 712/208 |
| 2012/0054447 | A1* | 3/2012 | Swart | G06F 12/0888 711/136 |
| 2012/0072668 | A1* | 3/2012 | Chirca | G06F 12/0862 711/122 |
| 2012/0254540 | A1* | 10/2012 | Kou | G06F 12/0862 711/122 |
| 2013/0304991 | A1* | 11/2013 | Bottcher | G06F 12/0864 711/122 |
| 2014/0075156 | A1* | 3/2014 | Blasco-Allue | G06F 9/3802 712/205 |
| 2014/0282546 | A1* | 9/2014 | Abdallah | G06F 9/45545 718/1 |

OTHER PUBLICATIONS

M. Gschwind, et al., "Page Table Including Data Fetch Width Indicator," Related Application, U.S. Appl. No. 14/253,059, filed Apr. 15, 2014.

M. Gschwind, et al., "Memory-Area Property Storage Including Data Fetch Width Indicator," Related Application, U.S. Appl. No. 14/253,072, filed Apr. 15, 2014.

M. Gschwind, et al., "Memory-Area Property Storage Including Data Fetch Width Indicator," Related Application, U.S. Appl. No. 14/483,563, filed Sep. 11, 2014.

M. Gschwind, et al., "Counter-Based Wide Fetch Management," Related Application, U.S. Appl. No. 14/253,086, filed Apr. 15, 2014.

M. Gschwind, et al., "Counter-Based Wide Fetch Management," Related Application, U.S. Appl. No. 14/483,576, filed Sep. 11, 2014.

* cited by examiner

| PFA 31-12 501 | WFFI 11-10 502 | WFI 9 503 | O 8 504 | L 7 505 | D 6 506 | A 5 507 | PCD 4 508 | PWT 3 509 | U 2 510 | W 1 511 | P 0 512 |
|---|---|---|---|---|---|---|---|---|---|---|---|

PAGE TABLE INCLUDING DATA FETCH WIDTH INDICATOR

CROSS-REFERENCE TO RELATED APPLICATION

This application is a continuation of U.S. application Ser. No. 14/253,059 (Gschwind et al.), filed on Apr. 15, 2014, which is herein incorporated by reference in its entirety.

BACKGROUND

The present invention relates generally to computer systems, and more specifically, to a page table including a data fetch width indicator in a computer system.

In the field of computing, a cache is a small, fast memory or storage device used to store data or instructions that were accessed recently, are accessed frequently, or are likely to be accessed in the future, by a processor. Reading from or writing to a cache is typically cheaper (in terms of access time and/or resource utilization) than accessing other memory or storage devices in a computer system. Once data is fetched from main memory and stored in the cache, the data can be accessed in the cache instead of re-fetching the data from main memory, saving both time and resources. A cache is made up of units of storage referred to as cache lines having a cache line size, and each cache line has an associated cache tag that references the cache line. Data may be fetched from the main memory in units equal to the cache line size for installation in the cache.

SUMMARY

Embodiments include a method and computer program product for a page table including a data fetch width indicator. An aspect includes allocating a memory page in a main memory of a computer to an application that is executed by a processor of the computer. Another aspect includes creating a page table entry corresponding to the memory page in the page table. Another aspect includes determining, by a data fetch width indicator determination logic, the data fetch width indicator for the memory page. Another aspect includes sending a notification of the determined data fetch width indicator from the data fetch width indicator determination logic to supervisory software. Another aspect includes setting the data fetch width indicator in the page table entry by the supervisory software based on the notification. Another aspect includes, based on a cache miss in a cache memory of the computer corresponding to an address that is located in the memory page, determining the data fetch width indicator in the page table entry associated with the memory page in the page table, and fetching an amount of data from the memory page based on the data fetch width indicator.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 5 depicts a page table entry including a data fetch width indicator in accordance with an embodiment;

DETAILED DESCRIPTION

Figure 1:
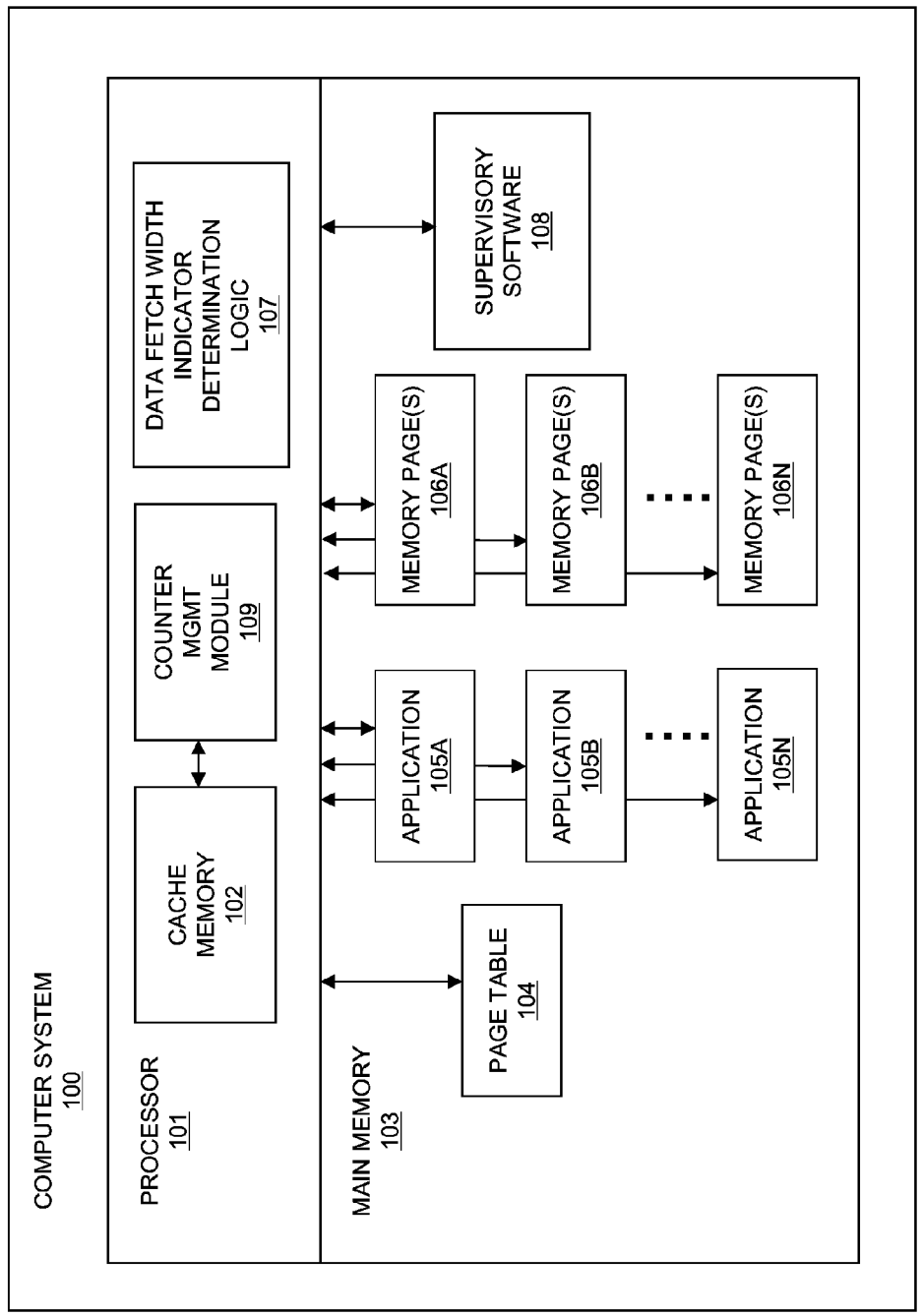
FIG. 1 depicts a computer system with a page table including a data fetch width indicator in accordance with an embodiment.

Embodiments of page table including a data fetch width indicator are provided, with exemplary embodiments being discussed below in detail. Some applications that are executed by a computer system may require a relatively large amount of adjacent data, and benefit from wider (larger) cache lines, while other applications may benefit from narrower (smaller) cache lines, which have more associativity and more index bits (e.g., cache tags). Therefore, a cache may be designed to have a relatively narrow cache line length (for example, 32 bytes or 64 bytes in some embodiments), and fetches to populate cache entries in the cache may correspond to one cache line, or may correspond to multiple cache lines, as needed by the application associated with the cache entry. The size of a cache entry is determined based on a data fetch width indicator that is stored in the page table entry for the memory page in the main memory from which the data in the cache entry was fetched. The data fetch width indicator may be set in each page table entry when a memory page is allocated for use by an application, and the corresponding page table entry is created in the page table. The data fetch width indicator may comprise, in various embodiments, a wide fetch indicator (WFI) that indicates whether wide fetching is enabled for the memory page, and/or a wide fetch factor indicator (WFFI) that indicates a number of cache lines to fetch simultaneously in a data fetch.

The data fetch width indicator in each page table entry may be set by software in some embodiments, based on, for example, a parameter in an MMAP system call; a parameter associated with an application, a library, or other code module; a software algorithm implemented by an application, a program loader, a dynamic optimization module, or supervisory software such as an operating system or a hypervisor. In other embodiments, the data fetch width indicator in each page table entry is set by hardware based on, for example, a hardware mechanism that identifies whether wide or narrow data fetches are appropriate for a particular memory page. In further embodiments, a hardware mechanism determines the data fetch width indicator, and sends a notification to the supervisory software to set the data fetch width indicator based on the determination.

In some embodiments, the data fetch width indicator may be set in the page table entry based on a type of the application for which the memory page is allocated. For example, database or high performance computing (HPC) workloads may have a relatively wide data fetch width indicator (e.g., 2 to 4 cache lines per data fetch), while other workloads, such as scripting languages (e.g., for domain-specific languages, or DSLs), may have a relatively narrow data fetch width indicator (e.g., a single cache line per data fetch). In other embodiments, the data fetch width indicator may be initialized to a default value. In further embodiments, the behavior of the application associated with a page table entry may be monitored during execution, and the data fetch width indicator in the page table entry may be updated based on the monitoring. The monitoring may maintain a counter of a number of times the application has accessed adjacent cache lines, and, based on the counter reaching a threshold, increase the data fetch width indicator in the page table entry associated with the application. In some embodiments, multiple page table entries in a page table may point to a single physical memory page; in such embodiments, multiple page table entries that point to the same memory page are simultaneously updated when the threshold is reached for the memory page. In another embodiment, multiple page table entries that point to the same memory page are separately updated when references to the page via a specific page table entry reach the threshold, reflecting a possibly different application access patterns via different page table entries.

The monitoring of application behavior and updating of the data fetch width indicator may be performed in conjunction with a runtime system that is executing the application, such as a just-in-time (JIT) compiler, a dynamic system optimizer, or a dynamic compiler. This may avoid direct manipulation of page table entries. For example, in a system using a Linux™ operating system in conjunction with PowerVM™, two distinct sets of page table structures are maintained, a first set by PowerVM and a second set by Linux. In such a system, when hardware indicates a page table entry fault, Linux installs a copy of its private radix page table entry in the PowerVM hardware page table. In some embodiments, Linux then synchronizes the PowerVM page table with the software page table after a data fetch width indicator in the software page table has been updated based on reaching the threshold. Thus, in some environments, the operating system may track the data fetch width indicators separately from the hardware translation implementation. The hardware page tables are managed as a cache, and are not copied back into the operating system page tables. Therefore, direct updates to the hardware page tables will be lost in the course of hardware page table entry replacement. Allowing an update to a data fetch width indicator to be processed by privileged supervisory software gives the software stack the ability to reflect the update in the operating system page table entries.

The monitoring may be implemented in a hardware module comprising a counter management module that determines updated data fetch width indicators based on identification of whether wide or narrow data fetches are appropriate for a particular memory region, which may comprise one or more memory pages in some embodiments, or a portion of a memory page in other embodiments. In some embodiments, single-bit use indicators are provided in each cache line in the cache memory, and the counter management module maintains a count of how often adjacent cache lines were touched based on the use indicators. If the counter for a memory region exceeds a threshold, the data fetch width indicator of the memory region is updated to allow wide fetches, or to increase the fetch size. In further embodiments, the counter for memory region may be disabled based on one of: enabling of wide fetch for the memory region, elapsing of a predetermined time period since assigning the counter to the memory region, and performing a predetermined number of fetches to the cache memory from the memory region. A disabled counter may be reused by a different memory region. In further embodiments, the counter management module determines a value for a data fetch width indicator for a memory region, and sends a hardware notification to supervisory software of the computer system, and the supervisory software sets the data fetch width indicator for the memory region based on the notification.

In various embodiments, a use indicator may be updated to indicate that a cache line was touched based one or more of a read access of the cache line, a write access of the cache line, and zeroing of the cache line by a dcbz instruction, which comprises instruction that fills a fixed-size chunk of memory with zeroes. The dcbz instruction may correspond to a fraction of a cache line in one embodiment, or correspond to an entire cache line in another embodiment.

In further embodiments, the cache memory is divided into blocks of N bytes, and a counter is maintained for each block in each level of cache. For example, in a processor with 3 levels of cache, there are 3 counters for each block. A counter(A,L) is a counter associated with a block at address A and cache level L. The cache memory is further organized as S sets of E elements each, and the elements are each cache lines having a cache line size (for example, 64 bytes). In this example, if two of those 64-byte cache lines from a contiguous 128 bytes in a memory page are fetched into the cache memory, the two cache lines are located in consecutive sets. In such an embodiment, the counters may be managed as follows: when there is a miss for an element at address A at cache level L, then, if counter(A,L)>=Threshold, wide fetch for the memory page in which the element is located is enabled; further, when an element at address A is evicted from the cache level L, if both 64-byte elements of a contiguous 128 bytes were touched (e.g., accessed for read-access, accessed for write access, and in at least one embodiment, zeroed by a dcbz instruction corresponding to a fraction of a cache line in one embodiment, and optionally corresponding to an entire cache line in another embodiment) in the cache (determined based on the use indicators), counter(A,L) is incremented; otherwise, counter(A,L) is decremented. In further embodiments, there may not be one counter per level of cache, rather, there may be one counter that is associated with one level of the cache.

Turning now to FIG. 1, a computer system 100 is generally shown. Computer system 100 includes a processor 101 and a main memory 103. Processor 101 includes a cache memory 102 that is used for local storage within processor 101. Processor 101 executes a plurality of applications 105A-N, which are located in main memory 103. Each of applications 105A-N has at least one respective allocated memory page(s) 106A-N that is used to store data corresponding to the application 105A-N (e.g., memory page(s) 106A are allocated to application 105A, etc.). Page table 104 is used for address translations from one of the effective or virtual addresses that are used by processor 101 during execution of applications 105A-N to real addresses in the main memory 103. Each of memory pages 106A-N has a respective page table entry in page table 104. Each page table entry in page table 104 includes a data fetch width indicator that indicates a width for data fetches from the memory page, such as allocated memory pages 106A-N, that is associated with the page table entry. The data fetch width indicator in each page table entry may vary based on the type of the application 105A-N that is associated with the memory page(s) 106A-N that is described by the page table entry. Computer system 100 further comprises a data fetch width indicator determination logic 107, which comprises a hardware mechanism for adjusting a data fetch width indicator in a page table entry in page table 104, and is discussed below in further detail with respect to FIG. 3. Supervisory software 108, which may comprise one or more of an operating system and a hypervisor, also runs on computer system 100. Computer system 100 further comprises a hardware counter management module 109 in communication with cache memory 102, which comprises a hardware mechanism for adjusting data fetch width indicators for memory page(s) 106A-N. FIG. 1 is shown for illustrative purposes only; in various embodiments, a computer system may execute any appropriate number of applications such as applications 105A-N, and may include any appropriate number of levels of cache memory.

Figure 2:
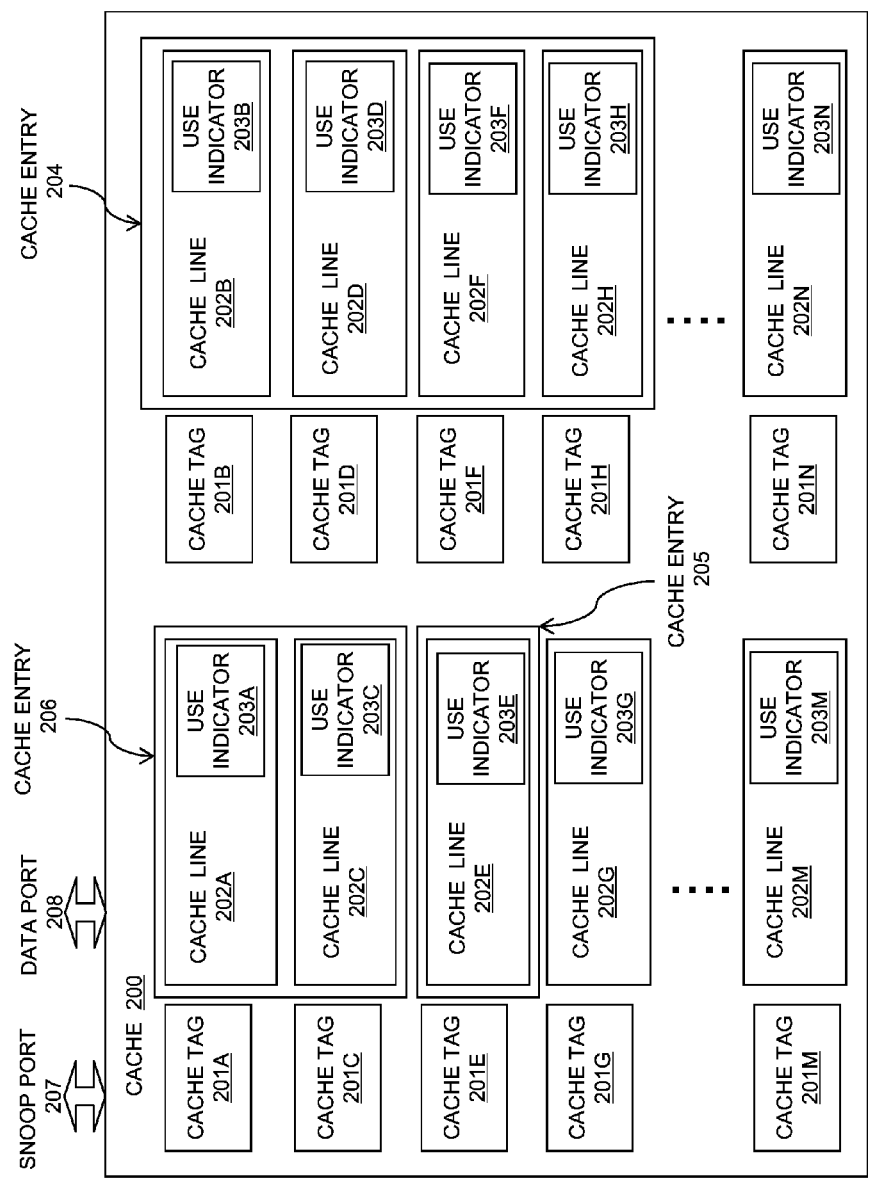
FIG. 2 depicts a cache memory for use with a page table including a data fetch width indicator in accordance with an embodiment.

FIG. 2 illustrates an embodiment of a cache memory 200. Cache memory 200 may comprise cache memory 102 of FIG. 1. Cache memory 200 includes a plurality of cache lines 202A-N, each referenced by a respective cache tag 201A-N. Cache entries, such as cache entries 203-205, may comprise one or more of cache lines 202A-N. The number of cache lines in a cache entry such as cache entries 202-205 is determined based on the data fetch width indicator that is stored in the page table entry associated with the memory page from which the data in the cache entry was fetched. Each of example cache entries 202-205 is associated with a memory page in the main memory that has a different respective data fetch width indicator in its page table entry.

In one embodiment, when a data access is made, an access to a first portion of a cache entry 203 corresponding to cache line 202A is performed in conjunction with a tag match of cache tag 201A; an access to a second portion of a cache entry 203 corresponding to cache line 202C is performed in conjunction with a tag match of cache tag 201C; an access to a first portion of a cache entry 204 corresponding to cache line 202B is performed in conjunction with a tag match of cache tag 201B; an access to a second portion of a cache entry 204 corresponding to cache line 202D is performed in conjunction with a tag match of cache tag 201D; an access to a third portion of a cache entry 204 corresponding to cache line 202F is performed in conjunction with a tag match of cache tag 201F; an access to a fourth portion of a cache entry 204 corresponding to cache line 202H is performed in conjunction with a tag match of cache tag 201H. Thus, a hit and miss indication can be separately determined for each cache line that is part of a single cache entry. In at least one such embodiment, not all cache line constituents of a single cache entry are located in the same associativity class in the cache memory 200. For example, in accordance with an embodiment, a cache entry may comprise cache line 202A with associated cache tag 201A, and cache line 202D with associated cache tag 201D.

In another embodiment, a single cache tag is used for an entire entry. In accordance with such embodiments, cache lines 202A and 202C in cache entry 203 are referenced by cache tag 201A; cache lines 202B, 202D, 202F, and 202H in cache entry 204 are referenced by cache tag 201B; and cache line 202E in cache entry 205 is referenced by cache tag 201E. In some embodiments, all cache lines of a single cache entry are placed in the same associativity class in the cache memory 200. In conjunction with a cache size entry indicator associated with each cache entry, cache tag matching may be performed using a single cache tag for all the cache lines that make up a cache entry.

Cache lines 202A-N may have any appropriate size in various embodiments. For example, each of cache lines 202A-N may be 32 bytes in some embodiments; in such embodiments, cache entry 203 is 64 bytes, cache entry 204 is 128 bytes, and cache entry 205 is 32 bytes. In another example, each of cache lines 202A-N may be 64 bytes in some embodiments; in such embodiments, cache entry 203 is 128 bytes, cache entry 204 is 256 bytes, and cache entry 205 is 64 bytes. FIG. 2 is shown for illustrative purposes only; a cache memory may have any appropriate number of cache lines and cache entries, and the cache entries may each span any appropriate number of cache lines.

Each cache line 202A-N includes a respective use indicator 203A-N comprising a 1-bit field that indicates whether the cache line has been touched by the processor 101. When a cache line is installed in cache memory 200, the associated use indicator is set to untouched (for example, 0); when the cache line is touched by the processor 101, the associated use indicator is set to touched (for example, 1). The cache memory 200 also includes a separate data port 208 that is used to install data in the cache memory 200 and to access data in the cache memory 200 by processor 101 in conjunction with tag match logic (not shown) to determine hits and misses in the cache memory 200. In some embodiments, the cache memory 200 further includes a snoop port 207, which may be used by a tag match logic (not shown) of the computer system to determine hits and misses in the cache memory 200 in order to determine whether remote processor data requests from memory refer to data currently resident in cache memory 200. In accordance with one embodiment, the counter management module 109 that was shown in FIG. 1 operates in conjunction with data port 208. In accordance with another embodiment, the counter management module 109 that was shown in FIG. 1 operates in conjunction with snoop port 207 such that the operations of the counter management module 109 do not conflict with data operations concurrently being performed via data port 208. FIG. 2 is shown for illustrative purposes only; a cache memory may have any appropriate number of cache lines and cache entries, and the cache entries may each span any appropriate number of cache lines. Further, in some embodiments, the cache memory includes an additional port that is distinct from the snoop and data port and that is used by the counter management module 109.

In various embodiments, a use indicator of use indicators 203A-N may be updated to indicate that its respective cache line was touched based one or more of a read access of the cache line, a write access of the cache line, and zeroing of the cache line by a dcbz instruction, which comprises instruction that fills a fixed-size chunk of memory with zeroes. The dcbz instruction may correspond to a fraction of a cache line in one embodiment, or correspond to an entire cache line in another embodiment.

Figure 3:
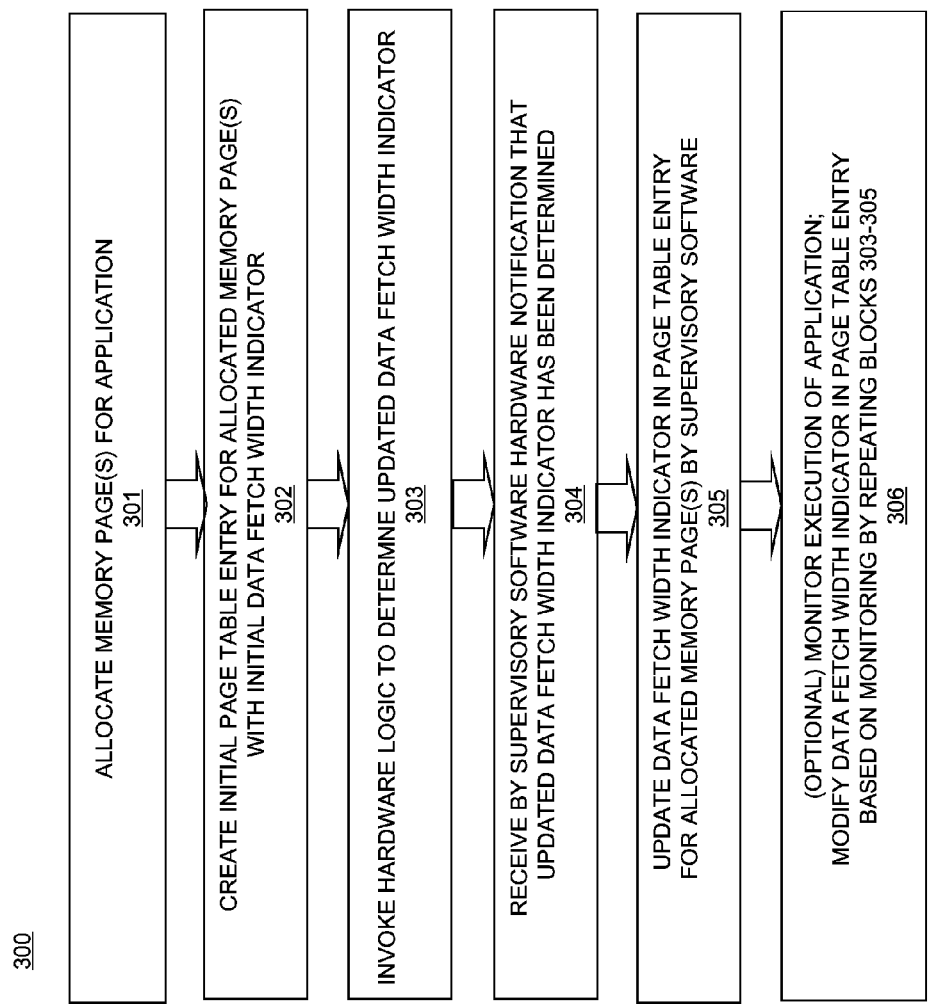
FIG. 3 depicts a process flow for memory page allocation using a page table including a data fetch width indicator in accordance with an embodiment.

FIG. 3 illustrates an embodiment of a method 300 for memory page allocation using a page table including a data fetch width indicator. FIG. 3 is discussed with reference to FIGS. 1 and 2. First, in block 301, an application, such as application 105A, is executed by processor 101, and at least one memory page such as memory page(s) 106A are allocated in main memory 103 for the application 105A. Next, in block 302, an initial page table entry including a data fetch width indicator is created in page table 104 for the allocated memory page(s) 106A. In some embodiments, the data fetch width indicator may be set in block 302 based on the type of application 105A. The data fetch width indicator may be set in block 302 by software in some embodiments, based on, for example, a parameter in an MMAP system call, a parameter associated with an application, a library, or other code module; a software algorithm implemented by an application, a program loader, a dynamic optimization module, an operating system, or a hypervisor. In other embodiments, the data fetch width indicator may be set in block 302 to a preferred initial size, such as a maximum cache line size, prior to performing a hardware method for optimizing the cache line size.

Next, in block 303, after an initial data fetch width indicator has been set in the page table entry for the memory page(s) 106A, a hardware module comprising a data fetch width indicator determination logic 107 is invoked in the hardware of computer system 100. The data fetch width indicator determination logic 107 is a hardware mechanism that identifies whether wide or narrow data fetches are appropriate for the particular memory page(s) 106A. In some embodiments, data fetch width indicator determination logic 107 is invoked with a special instruction. In other embodiments, the data fetch width indicator determination logic 107 invoked based on writing to, for example, a control register in computer system 100. In some embodiments, the writing to the control register provides additional configuration information for use in determining the data fetch width indicator, for example, a threshold for determining a preferred line size, e.g., a number of accesses to be performed before a determination of the data fetch width indicator is made. In further embodiments, the data fetch width indicator determination logic 107 is invoked based on an initial load of the page table entry into a memory management unit (MMU) translation structure, such as an effective to read address translation (ERAT) or a translation lookaside buffer (TLB). Invoking the data fetch width indicator determination logic 107 causes the data fetch width indicator determination logic 107 to determine an updated data fetch width indicator responsive to workload behavior of application 105A and current overall system behavior of computer system 100 in block 303.

Next, in block 304, a hardware notification is received indicating that an updated data fetch width indicator has been determined for memory page(s) 106A. The notification comprises a hardware exception to that is received by supervisory software 108 from the data fetch width indicator determination logic 107. In some embodiments, the supervisory software 108 comprises an operating system or a hypervisor.

Then, in block 305, based on receiving the notification of block 304 by the supervisory software 108, the updated data fetch width indicator is set in the page table entry for memory page(s) 106A in page table 104. In some embodiments, upon receiving the notification, the supervisory software 108 determines which page table entry in page table 104 corresponds to the notification, and the updated data fetch width indicator is set in the page table entry that corresponds to the notification. In one such embodiment, when the supervisory software 108 updates the page table entry, an invalidation operation is performed to force a subsequent reloading of a page table entry with the updated data fetch width indicator to a translation structure such as an ERAT or TLB. In some embodiments, two distinct page table representations are present, e.g., a first software page table structured as a radix page table, and a second hardware page table, or hashed page table (HPT), that is maintained as a hashed cache of recently used page translations that is managed by hardware. In some embodiments, the software page table is directly maintained by the operating system, and the HPT is maintained jointly by an operating system and a hypervisor. In some embodiments, when a notification is delivered from hardware to the operating system, the software page table is then updated with the hardware-determined data fetch width indicator. A hypervisor call is then performed to update a cached value for a data fetch width indicator in the HPT. In further embodiments, data fetch width indicator determination logic 107 in computer system 100 may directly update at least one page table entry in addition to sending the notification, in order to reduce the overhead associated with performing the processing of a notification event. In further embodiments, data fetch width indicator determination logic 107 may directly update the data fetch width indicator in at least one translation structure entry (such as an ERAT or TLB entry) in addition to performing a page table update to reduce the overhead associated with synchronizing a data fetch width indicator contained in a translation entry with a page table entry.

In further embodiments, when the notification is delivered directly to the hypervisor, the hypervisor may update the HPT, and further optionally send a notification to the operating system to update a software page table. No synchronization is necessary from the OS to the hypervisor to update the HPT in such an embodiment. In further embodiments, the data fetch width indicator determination logic 107 is configurable, such that the data fetch width indicator determination logic 107 may perform one or both of sending a notification to the supervisory software 108, and directly updating at least one of a page table entry and an address translation structure entry (e.g., reflective of a system using two levels of page tables corresponding to software and hardware page tables and utilizing notifications, and a system using a single level of hardware page tables). In further embodiments, the notification is sent in conjunction with additional algorithms in software, for example, a JIT, a dynamic system optimizer, or dynamic re-compiler to further determine a final data fetch width indicator for a page such as memory page(s) 106A, giving software additional control over system performance. In some embodiments, multiple page table entries may point to a single physical page in main memory 103, making it desirable to simultaneously update multiple PTEs when a notification is received.

Lastly, in block 306, during execution of application 105A, the execution of the application 105A is monitored, and the data fetch width indicator in the page table entry corresponding to application 105A may be updated based on the monitoring by repeating blocks 303-305. The monitoring of block 306 occurs in conjunction with invoking of the data fetch width indicator determination logic 107 as described with respect to block 303, either immediately after the initial determination of the data fetch width indicator, or periodically based on either changes in system workloads and configuration, or after a fixed period of time has lapsed. System configuration events that may trigger monitoring may include changes in the number or nature of workloads simultaneously executed by computer system 100, or changes in system behavior (e.g., cache miss rates, instructions per cycle (IPC), cycles per instruction (CPI), or other such performance indicators) being observed by hardware or a program optimization component. The monitoring may comprise maintaining a counter of a number of times the application 105A accesses adjacent cache lines, and comparing the counter to a threshold to determine whether the data fetch width indicator in the page table entry corresponding to the application needs to be modified.

Figure 4:
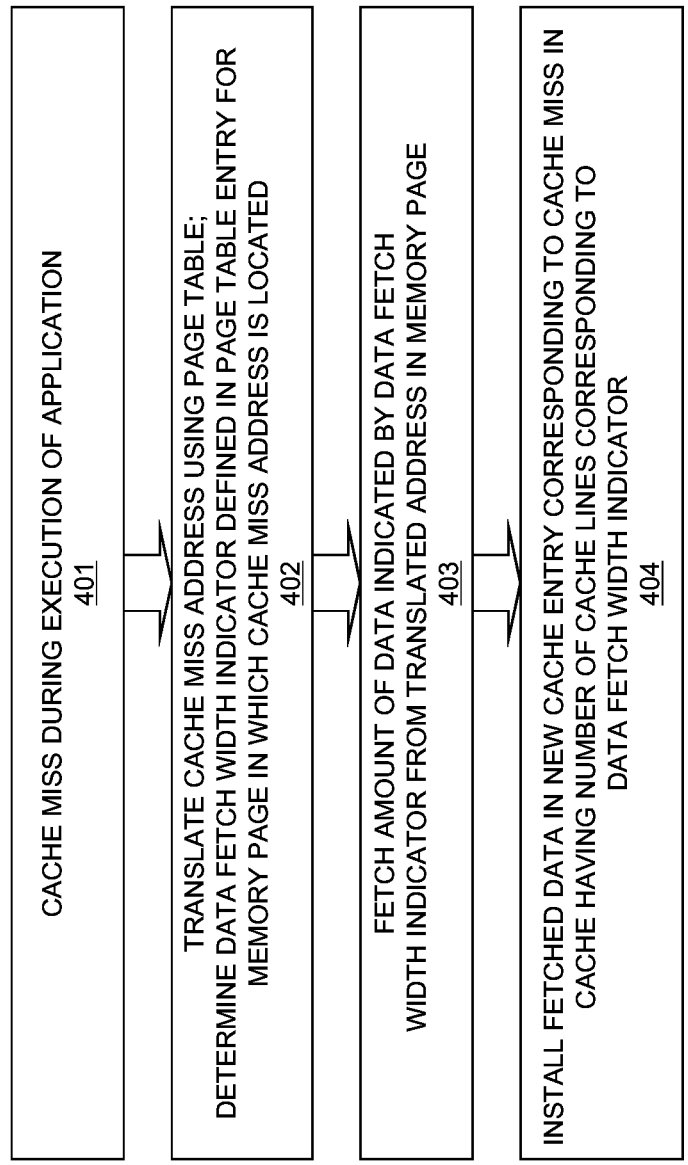
FIG. 4 depicts a process flow for a data fetch using a page table including a data fetch width indicator in accordance with an embodiment.

FIG. 4 illustrates an embodiment of a method 400 for a data fetch using a page table including a data fetch width indicator. FIG. 4 is discussed with reference to FIGS. 1 and 2. First, in block 401, there is a cache miss in cache memory 102 during execution of an application, such as application 105A, by processor 101. Next, in block 402, processor 101 uses page table 104 to translate one of the effective or virtual address of the cache miss to a real address in memory page(s) 106A in main memory 103, and also determines the data fetch width indicator of the memory page where the real address associated with the cache miss is located. The data fetch width indicator is located in the memory page's associated page table entry in page table 104. In block 403, the processor 101 fetches the data associated with the cache miss from the location in the memory page(s) 106A that is specified by the real address. The amount of data that is fetched corresponds to the data fetch width indicator that was determined in block 403. In some embodiments of block 403 of method 400, the fetched data comprises a set of cache lines starting at a multiple of the fetch width, i.e., if the cache line size is 32 bytes and the fetch width is 4 cache lines, then the following fetches are executed:

for $I=0\ldots 3$ fetch((start_address & MASK)+$I$*32)

In some embodiments, the mask corresponds to a mask to mask out bits corresponding to a line index within an entry. In the above example, the cache line size is 32 bytes and the fetch width is 128 bytes (4 cache lines), then the MASK value would be 0xFFFFFF80 (binary 0b11111111111111111111111110000000), if the address is expressed as a 32-bit byte address. More generally, in at least one embodiment, the mask corresponds to (WFFI*CLS), i.e., the two's complement of the wide fetch factor indicator (WFFI) in the page table, or specified elsewhere (e.g., in a boot parameter, SPR, during design time, and so forth), multiplied by the cache line size (CLS). Thus, more generally, the fetch might be expressed as:

for $I=0\ldots$ WFFI-1 fetch((start_address &(-WFFI*CLS))+$I$*CLS)

if the fetch address is a byte address. In other embodiments of block 403 of method 400, a set of cache lines starting at the requested line is fetched, i.e., for $I=0\ldots 3$ fetch(start_address+$I$*32)

More generally, this may be expressed in terms of the number of cache lines in an entry as:

for $I=0\ldots$ WFFI-1 fetch(start_address+$I$*CLS)

if the fetch address is a byte address. Lastly, in block 404, the fetched data is corresponding to the cache miss is installed in the cache as a cache entry. The cache entry may comprise one or more lines in the cache memory, as specified by the data fetch width indicator that was determined in block 402.

FIG. 5 depicts an embodiment of a page table entry 500 including a data fetch width indicator. Page table entry 500 may be stored in page table 104 of FIG. 1. Page table entry 500 of FIG. 5 is a 32-bit entry comprising a plurality of fields 501-512. The data fetch width indicator in page table entry 500 comprises wide fetch factor indicator (WFFI) 502, which is stored in bit 11 and bit 10, and wide fetch indicator (WFI) 503, which is stored in bit 9. The WFFI 502 indicates how many lines should concurrently be fetched from the memory page associated with page table entry 500, and the WFI 503 indicates whether wide fetch is enabled for the memory page associated with page table entry 500. Bit 31 through bit 12 comprise a page frame address (PFA) 501. Bit 8 comprises a zero field 504. Bit 7 comprises an L field 505. Bit 6 comprises a dirty indicator field 506. Bit 5 comprises an accessed indicator field 507. Bit 4 comprises a page cache disabled indicator field 508. Bit 3 comprises a page write transparent indicator field 509. Bit 2 comprises a user accessible indicator field 510. Bit 1 comprises a writeable indicator field 511. Bit 0 comprises a present indicator field 512. Page table entry 500 is shown for illustrative purposes only; for example, in some embodiments, WFI 503 may be omitted, and a 3-bit WFFI 502 may be provided. FIG. 5 is shown for illustrative purposes only, a page table entry may have any appropriate number of bits and any appropriate number and type of fields. In some embodiments, the WFFI and WFI are represented by a single field, and one particular WFFI value may indicate no wide fetch.

While the storage of WFFI 502 and WFI 503 are discussed above in conjunction with storage in page table entries, in another embodiment, the WFFI 502 and WFI 503 are stored in a segment tables in conjunction with segment table entries. In accordance with one embodiment, WFFI 502 and WFI 503 are stored in the segment lookaside buffer entries (SLBE) of the segment lookaside buffer (SLB) of the Power ISA.

In some embodiments, one or both of the WFFI 502 and WFI 503 are stored in a caching structure for page translations in hardware so as to accelerate access to the WFFI 502 and WFI 503. In at least one embodiment, the WFFI 502 and WFI 503 are obtained from one of a page table entry (PTE, optionally cached in a TLB) and a segment lookaside entry (SLBE) of a segment lookaside buffer during the address translation process and stored in the effective to real address table for rapid access in conjunction with block 402 of FIG. 4.

Embodiments of a page table entry including a data fetch width indicator may be implemented in environments based on the PowerPC architecture, also referred to as Power ISA, offered by International Business Machines Corporation (IBM®) and described in the Power ISA™ Version 2.06 Revision B specification, Jul. 23, 2010, hereby incorporated by reference herein in its entirety, and may include one or more aspects, as well as computing environments of other architectures, such as the z/Architecture, offered by International Business Machines Corporation, and described in z/Architecture—Principles of Operation, Publication No. SA22-7932-09, 10th Edition, September 2012, which is hereby incorporated by reference herein in its entirety.

Figure 6:
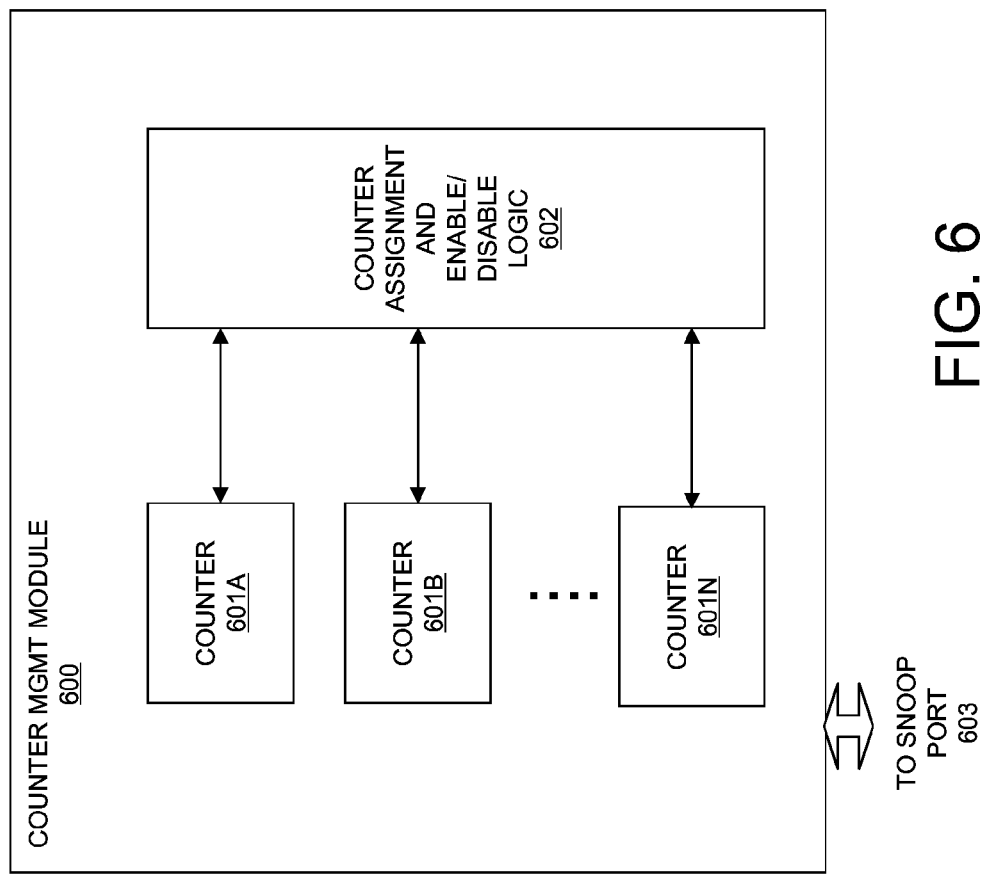
FIG. 6 depicts a counter management module for counter-based wide fetch management in accordance with an embodiment.

FIG. 6 illustrates an embodiment of a counter management module 600. Counter management module 600 may comprise counter management module 109 of FIG. 1. Counter management module 600 includes a plurality of counters 601A-N, and a counter assignment and enable/disable logic 602. The counter management module 600 further includes an interface 603 to a snoop port of a cache memory such as cache memory 102/200, or to another port to cache memory 200. Counter assignment and enable/disable logic 602 assigns counters of counters 601A-N to memory regions of memory pages 106A-N that are allocated to applications such as applications 105A-N, and increments and decrements the counters 601A-N as needed based on accesses of adjacent lines in the cache memory. Counter assignment and enable/disable logic 602 further determines if a counter of counters 601A-N is above a predetermined threshold, and, based on determining that a counter of counters 601A-N is above the predetermined threshold, causes a hardware notification to be sent to the supervisory software 108 so that supervisory software 108 may update the data fetch width indicator of memory region of memory page(s) 106A-N that is associated with the counter. Counter assignment and enable/disable logic 602 further determines if a predetermined time period or a predetermined number of fetches have elapsed since the assignment of a counter of counters 601A-N, and if the predetermined time period or the predetermined number of fetches have elapsed, disables the counter. A disabled counter may be reassigned to a subsequent memory region of an application. FIG. 6 is shown for illustrative purposes only; a counter management module may include any appropriate number of counters, and may, in some embodiments, be connected to an additional port of the cache memory that is distinct from both the snoop port and the data port.

In some embodiments of a counter management module 600, counters 601A-N are stored in a separate counter array. In some embodiments, a counter is associated with a memory block and may optionally be stored in conjunction with a translation structure for translating addresses of memory blocks that are organized as a cache of recent address translations for blocks of memory.

Figure 7:
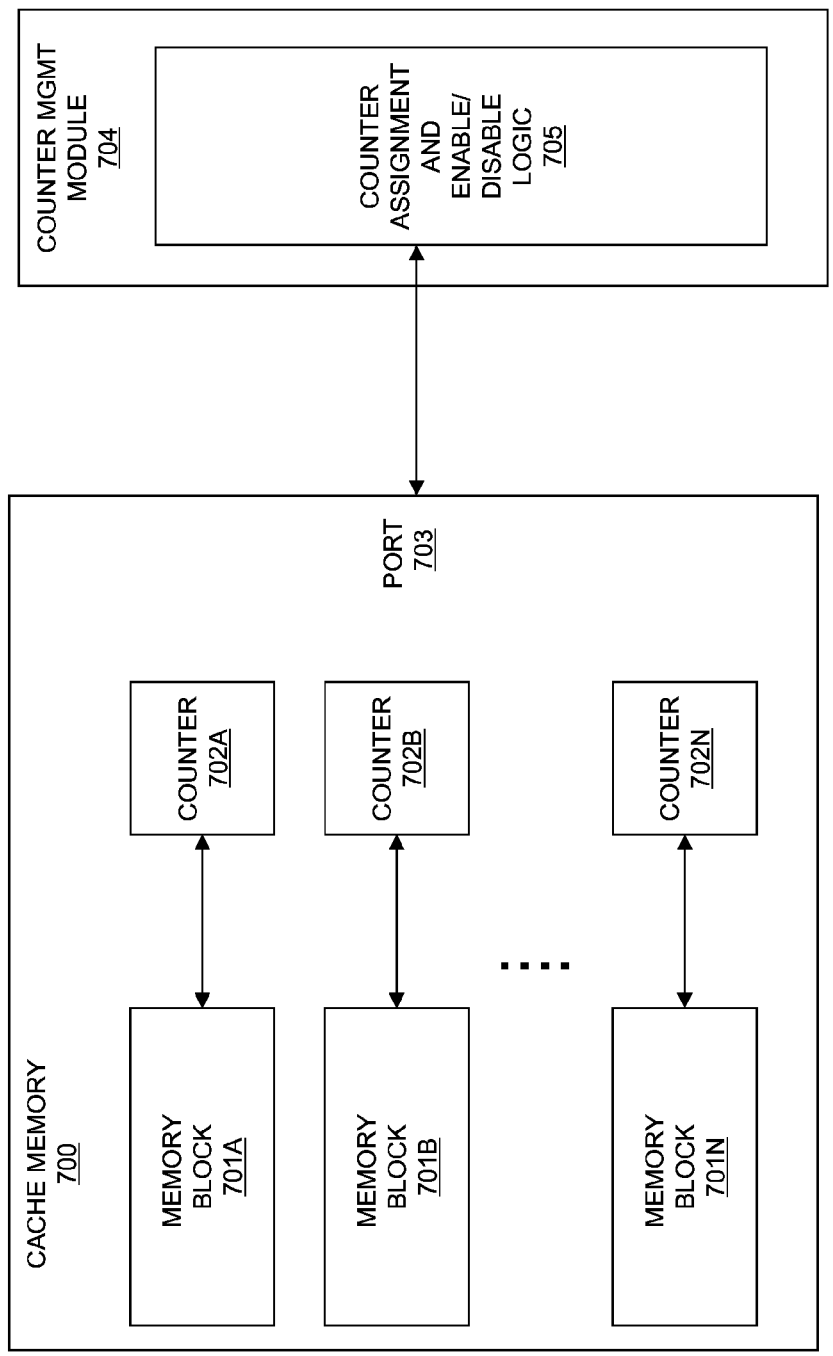
FIG. 7 depicts a cache memory and counter management module for counter-based wide fetch management in accordance with an embodiment.

FIG. 7 illustrates an embodiment of a counter management module 704, in conjunction with a cache memory 700. Counter management module 704 may comprise counter management module 109 of FIG. 1, and cache memory 700 may comprise one of a translation lookaside buffer (TLB), a segment lookaside buffer (SLB), and an effective to real address table (ERAT). In the embodiment of FIG. 7, the cache memory 700 comprises a plurality of memory blocks 701A-N, and a respective counter 702A-N is maintained in the cache memory 700 for each memory block 701A-N. The memory blocks 701A-N may be about 4 kilobytes each in some embodiments. Each counter 702A-N may be assigned to addresses in the counter's respective memory block of memory blocks 701A-N. The counters 702A-N are managed by counter assignment and disable/enable logic 705 in counter management module 704 via port 703, as described above with respect to counter management module 600 of FIG. 6. FIG. 7 is shown for illustrative purposes only; a cache memory may comprise any appropriate number of memory blocks of any appropriate size, and each memory block may have any appropriate number of associated counters.

In at least one embodiment, cache memory 700 corresponds to a cache of address translations. In one embodiment, cache memory 700 comprises a TLB and stores virtual to physical (or real) memory addresses translations. In one such embodiment, each memory block 701A-N corresponds to a memory page. In another embodiment, a plurality of memory pages comprise to a single memory block of memory blocks 701A-N and are associated with a single counter 702A-N. In one embodiment, each counter of counters 702A-N is statically associated with a respective memory block 701A-N. In another embodiment, a counter 702A-N is assigned to a memory bock by counter assignment logic 705. In one embodiment, data fetch width indicators are associated with pages translated by the TLB. In another embodiment, in which a plurality of memory pages comprise a memory block, data fetch width indicators are associated with pages translated by the TLB. In another embodiment, in which a plurality of memory pages comprise a memory block, data fetch width indicators are associated with memory blocks comprising multiple memory pages translated by the TLB.

In further embodiments, cache memory 700 corresponds to a SLB and stores effective to virtual memory addresses translations. In one embodiment, such segment address translations are performed in accordance with the Power ISA. In one such embodiment, each memory block 701A-N corresponds to a memory segment. In another embodiment, a plurality of memory segments correspond to a memory block 701A-N and are associated with a single counter 702A-N. In another embodiment, a portion of a segment corresponds to a memory block 701A-N and is associated with a single counter 702A-N. In one embodiment, each counter of counters 702A-N is statically associated with each memory block 701A-N. In another embodiment, a counter 702A-N is assigned to a memory block by counter assignment logic 705. In one embodiment, data fetch width indicators are associated with segments translated by the SLB. In another embodiment, in which a plurality of memory segments constitute a memory block, data fetch width indicators are associated with segments translated by the SLB. In another embodiment, in which a portion of a memory segment constitutes a memory block, multiple data fetch width indicators are associated with segments translated by the SLB. In another embodiment, in which one of segments, pluralities of segments, and portions of segments correspond to a memory counters, data fetch width indicators are associated with memory pages. In one such embodiment, data fetch width indicators are stored in one of a TLB, an effective to real address table (ERAT), a page table, a separate data fetch width cache, and key storage.

In further embodiments, cache memory 700 corresponds to ERAT and stores effective to real (or physical) memory addresses translations. In one such embodiment, each memory block 701A-N corresponds to a memory page translated by the ERAT. In another embodiment, a plurality of memory pages translated by the ERAT correspond to a memory block 701A-N and are associated with a single counter of counters 702A-N. In one embodiment, each counter of counters 702A-N is statically associated with each memory block 701A-N. In another embodiment, a counter 702A-N is assigned to a memory block by counter assignment logic 705. In one embodiment, data fetch width indicators are associated with pages translated by the ERAT. In another embodiment, in which a plurality of memory pages comprise a memory block, data fetch width indicators are associated with pages translated by the ERAT. In another embodiment, in which a plurality of memory pages comprise a memory block, data fetch width indicators are associated with memory blocks consisting of multiple pages translated by the ERAT.

In at least one embodiment, when an address translation for a memory block of memory blocks 701A-N is evicted from cache memory 700, an associated counter of counters 702A-N is deallocated for the associated memory block. In one embodiment, when an address translation is evicted, a value of deallocated associated counter 702A-N is stored in storage. In accordance with one embodiment, the value is stored in another cache structure, e.g., when an ERAT address translation is deallocated, a counter may be stored in a corresponding TLB entry. In another embodiment, the counter value is stored in cache memory 200, e.g., optionally in a transient cache storage with discard function for disposable data. In another embodiment, storage of the counter value is in main memory 103. In accordance with one embodiment, storage of the counter value is performed automatically by hardware. In another embodiment, a notification step is performed to supervisory software 108 and the counter value is stored by supervisory software 108. In at least one embodiment, when a counter 702A-N has been deallocated, the counter is allocated to a new memory block. When the counter is allocated to a new memory block, in one embodiment, the counter is initialized to 0. In another embodiment in which a previous counter value for an associated memory block has been stored, the stored counter value is retrieved and used to initialize the newly allocated counter.

Figure 8:
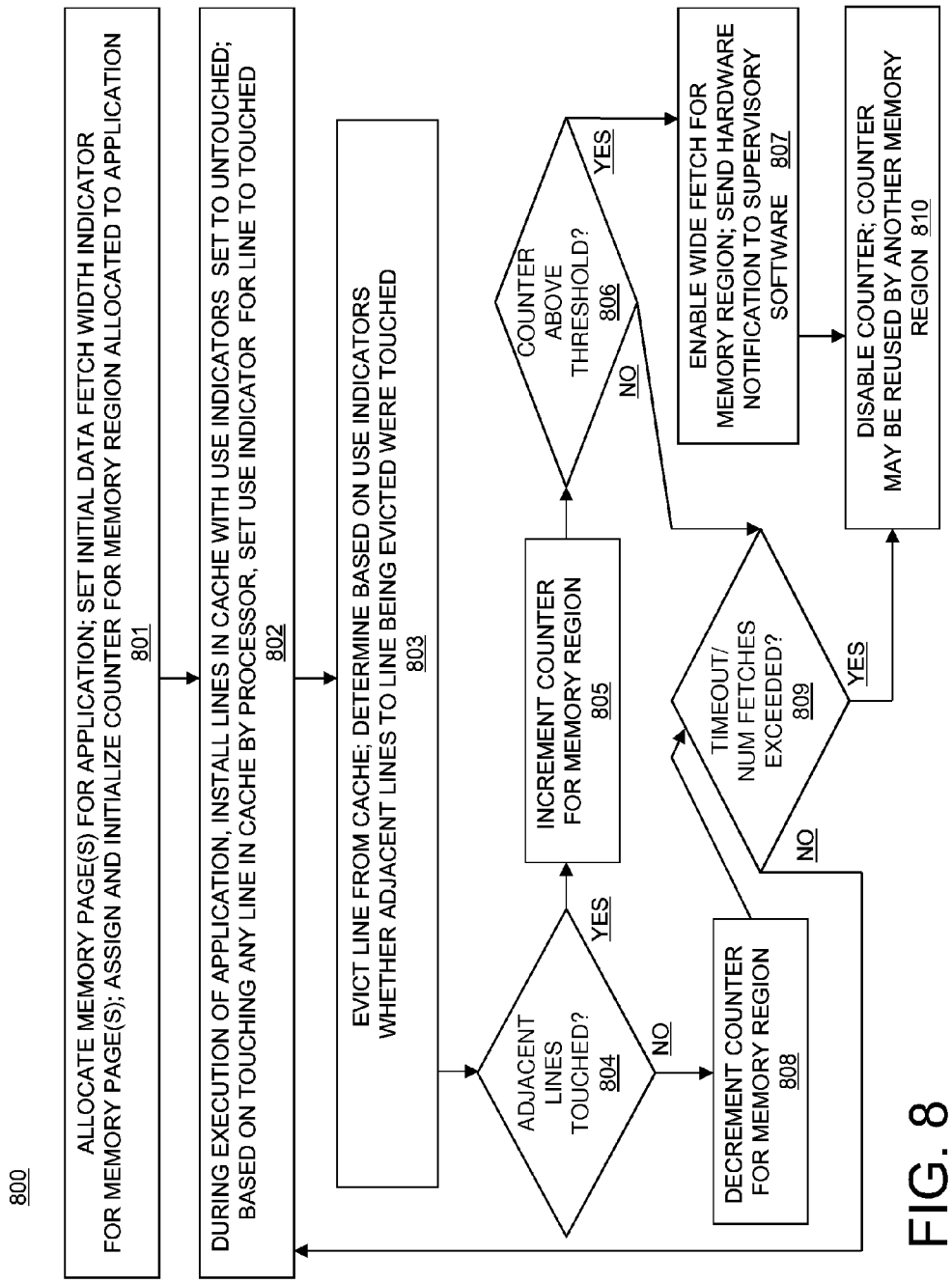
FIG. 8 depicts a process flow counter-based wide fetch management in accordance with an embodiment.

FIG. 8 illustrates an embodiment of a method for counter-based wide fetch management. FIG. 8 is discussed with respect to FIGS. 1-7. First, in block 801, an application, such as application 105A, starts execution by processor 101, and at least one memory page such as memory page(s) 106A are allocated in main memory 103 for the application 105A. An initial data fetch width indicator, which may correspond to a narrow cache line size, is set for the allocated memory page(s) 106A. The data fetch width indicator may be set in a page table entry associated with the memory page(s) 106A in some embodiments, or in memory-area property storage in the memory page(s) 106(A) in main memory 103 in other embodiments. Further, in block 801, a counter, which may be one of counters 601A-N shown in FIG. 6, or counters 702A-N as shown in FIG. 7, is assigned and initialized for a memory region that is allocated to application 105A by counter management module 109. The memory region may comprise one or more of memory page(s) 106A in some embodiments or a portion of a memory page of memory page(s) 106A in other embodiments. Multiple counters may be assigned to a single application such as application 105A; each counter corresponds to a single memory region.

Next, in block 802, during execution of application 105A, cache lines, such as cache lines 202A-N, are installed in the cache memory 102 from memory page(s) 106A. When a cache line is installed, the cache line's associated use indicator 203A-N is set to untouched. When the processor 101 touches the line during execution of the application 105A, the associated use indicator 203A-N is set to touched. In various embodiments, a use indicator 203A-N may be updated to indicate that the use indicator's respective cache line was touched based one or more of a read access of the cache line, a write access of the cache line, and zeroing of the cache line by a dcbz instruction, which comprises instruction that fills a fixed-size chunk of memory with zeroes. The dcbz instruction may correspond to a fraction of a cache line in one embodiment, or correspond to an entire cache line in another embodiment.

Next, in block 803, a line, such as cache line 202A, that is associated with a memory region of memory page(s) 106A is evicted from the cache 200, and it is determined by counter management module 109 whether an adjacent line, such as cache line 202B, was also touched based on use indicator 203B. Table 1 illustrates a pseudocode example of block 803 for an embodiment where a cache entry can comprise up to 2 cache lines:

TABLE 1

Pseudocode for determining whether adjacent lines have been touched

```
// assume element[i][set] is to be evicted,
having fields element[i][set].tag to store a tag,
// element[i][set].valid to store valid bit,
// element[i][set].accessed to store whether a
cache line has been accessed (touched)
//etc.
both_halves_touched <= FALSE;
for j in element_count
    if (element[j][set XOR 1].tag == element[i][set].tag)
        if (element[j][set XOR 1].accessed)
            both_halves_touched <= TRUE;
    both_halves_touched <= both_halves_touched
    AND element[i][set].accessed;
```

In accordance with the pseudocode example of Table 1, in at least one embodiment, the cache tag comparison for up to j tag matches corresponding to j associative elements in an associativity class are performed in parallel by tag match logic associated to a data port 208 to perform cache hit/miss determination and way selection in conjunction with a data port 208, or by tag match logic associated to a cache snoop port 207 to perform interference determination based on snooping remote processor data accesses, or protocol requests, in accordance with the operation of snoop port 207 to perform multi-processor coherence actions.

Next, in block 804, if it was determined that both adjacent lines of a prospective wide cache entry were touched (accessed), flow proceeds to block 805, in which the counter associated with the memory region that is assigned to the counter is incremented by counter management module 109. Flow then proceeds to block 806, in which it is determined whether the counter that was incremented in block 805 is above a predetermined threshold. In some embodiments of block 806, it may also be determined whether a predetermined number of fetches have been performed from the memory region; if the predetermined number of fetches have not been performed, it may be determined that the counter is not above the predetermined threshold in block 806, so as to avoid having a low number of fetches cause an over-threshold condition. If it is determined in block 806 that the counter is above the threshold, flow proceeds to block 807, and wide fetch is enabled for the memory region. This may be performed by sending a hardware notification from counter management module 109 to supervisory software 108. In one embodiment, the hardware notification consists of an exception being raised, with control being transferred to supervisory software 108. Supervisory software 108 may then update the data fetch width indicator of the memory region based on the notification. In one embodiment, when a counter has been assigned to a plurality of pages or regions, a plurality of data fetch width indicators are updated. The data fetch width indicator may be updated by the supervisory software 108 in a page table entry associated with the memory region in some embodiments, or in memory-area property storage in the memory region in main memory 103 in other embodiments. Flow then proceeds from block 807 to 810, in which the counter associated with the memory region is disabled based on wide fetch having been enabled for the memory region; the counter may then be reassigned for use by another memory region by counter management module 109. If it was determined in block 806 that the counter is not above the threshold, flow proceeds from block 806 to block 809, which is discussed below.

If it was determined in block 804 that adjacent lines were not touched (accessed), flow proceeds from block 804 to block 808, in which the counter associated with the memory region is decremented. Flow then proceeds to block 809, in which it is determined whether a predetermined amount of time or predetermined number of fetches have elapsed since the particular counter was assigned and initialized in block 801. If it is determined in block 809 that the predetermined amount of time or predetermined number of fetches have elapsed since the counter was assigned and initialized in block 801, flow proceeds from block 809 to block 810, in which the counter associated with the memory region is disabled; the counter may be reassigned for use by another memory region by counter management module 109. If it is determined in block 809 that the predetermined amount of time or predetermined number of fetches have not elapsed since the counter was assigned and initialized in block 801, flow proceeds from block 809 to back to block 802, and execution of the application 105A continues.

Technical effects and benefits include tailoring the width of data fetches to the workload for which the data is fetched.

Figure 9:
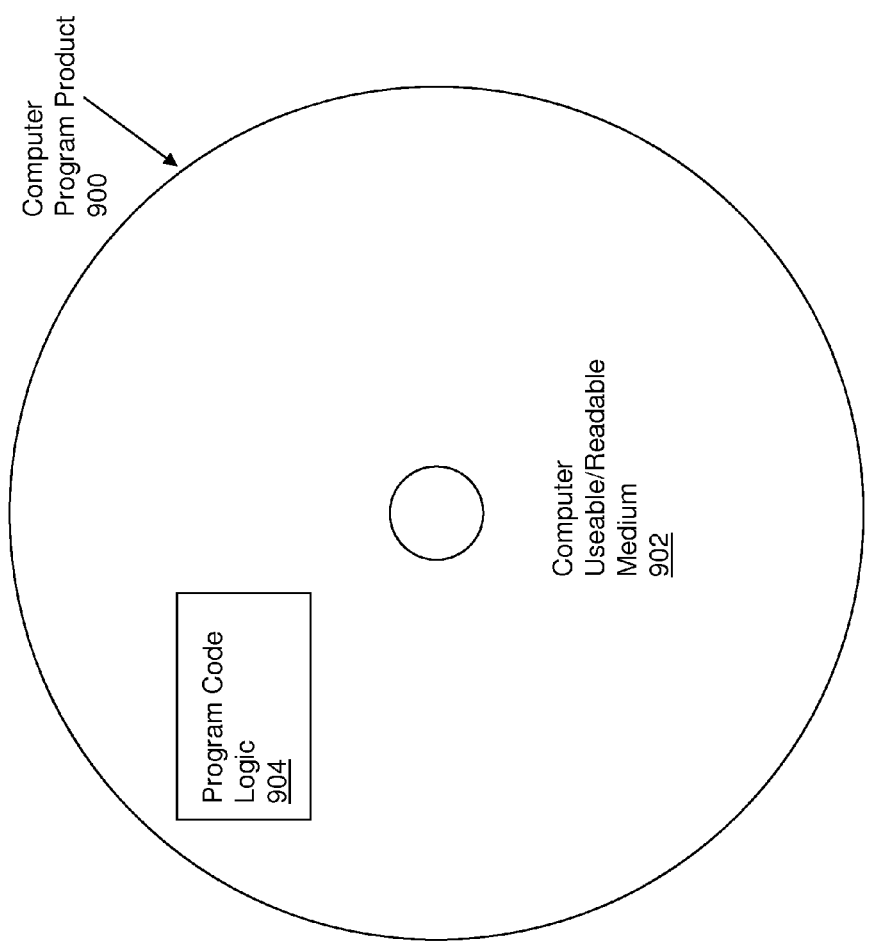
FIG. 9 illustrates a computer program product in accordance with an embodiment.

Referring now to FIG. 9, in one example, a computer program product 900 includes, for instance, one or more storage media 902, wherein the media may be tangible and/or non-transitory, to store computer readable program code means or logic 904 thereon to provide and facilitate one or more aspects of embodiments described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for a page table including a data fetch width indicator, the method comprising:
    allocating a memory page in a main memory of a computer for an application that is executed by a processor of the computer;
    creating a page table entry corresponding to the memory page in the page table, the page table entry storing data used to perform an address translation from a virtual address of the memory page used by the processor during execution of the application to a real address of the memory page in the main memory;
    determining the data fetch width indicator for the memory page;
    sending a notification of the determined data fetch width indicator to supervisory software;
    setting the data fetch width indicator in the page table entry by the supervisory software based on the notification, wherein the data fetch width indicator comprises a wide fetch indicator that indicates whether fetching of multiple cache lines concurrently is enabled for the memory page, and a wide fetch factor indicator that indicates a number of cache lines to be fetched concurrently for the memory page; and
    in response to a cache miss in a cache memory of the computer corresponding to a start address that is located in the memory page:
        accessing the data fetch width indicator in the page table entry associated with the memory page in the page table;
        determining a fetch start address by masking the start address based on the wide fetch factor indicator and the data fetch width indicator; and
        fetching an amount of data from the memory page, wherein the amount is based on the data fetch width indicator and the fetching starts at the fetch start address.

2. The method of claim 1, wherein the data fetch width indicator is set in the page table entry based on a type of the application.

3. The method of claim 1, further comprising:
    monitoring execution of the application; and
    updating the data fetch width indicator in the page table entry corresponding to the application based on the monitoring.

4. The method of claim 1, wherein the data fetch width indicator comprises a wide fetch factor indicator that indicates a number of cache lines to be fetched simultaneously for the memory page.

5. The method of claim 1, further comprising installing the fetched data in the cache memory as a cache entry, wherein the cache entry spans a plurality of cache lines of the cache memory.

6. The method of claim 1, wherein the cache memory comprises a plurality of cache entries corresponding to different applications, each application having a respective page table entry including a respective data fetch width indicator, and wherein a first cache entry of the plurality of cache entries comprises a different number of cache lines from a second cache entry of the plurality of cache entries based on respective data fetch width indicators that are associated with the first cache entry and the second cache entry.

7. A computer program product for implementing a page table including a data fetch width indicator, the computer program product comprising:
    a tangible storage medium readable by a processing circuit and storing instructions for execution by the processing circuit for performing a method comprising:
    creating a page table entry in the page table, the page table entry corresponding to a memory page, the page table entry storing data used to perform an address translation from a virtual address of the memory page used by a processor during execution of an application to a real address of the memory page in the main memory;
    determining the data fetch width indicator for the memory page;
    sending a notification of the determined data fetch width indicator to supervisory software;
    setting the data fetch width indicator in the page table entry by the supervisory software based on the notification, wherein the data fetch width indicator comprises a wide fetch indicator that indicates whether fetching of multiple cache lines concurrently is enabled for the memory page, and a wide fetch factor indicator that indicates a number of cache lines to be fetched concurrently for the memory page; and based on a cache miss in a cache memory of the computer corresponding to a start address that is located in the memory page:
    accessing the data fetch width indicator in the page table entry associated with the memory page in the page table;
    determining a fetch start address by masking the start address based on the wide fetch factor indicator and the data fetch width indicator; and
    fetching an amount of data from the memory page, wherein the amount is based on the data fetch width indicator and the fetching starts at the fetch start address.

8. The computer program product of claim 6, wherein the data fetch width indicator is set in the page table entry based on a type of the application.

9. The computer program product of claim 6, further comprising:
    monitoring execution of the application; and
    updating the data fetch width indicator in the page table entry corresponding to the application based on the monitoring.

10. The computer program product of claim 6, wherein the data fetch width indicator comprises a wide fetch factor indicator that indicates a number of cache lines to be fetched simultaneously for the memory page.

\* \* \* \* \*